Oct. 19, 1948.     C. W. HAWTHORNE     2,451,948

SHEARING APPARATUS

Filed April 26, 1946

INVENTOR.
CHARLES W. HAWTHORNE
BY
Albert G. Blodgett
ATTORNEY

Patented Oct. 19, 1948

2,451,948

UNITED STATES PATENT OFFICE 2,451,948

SHEARING APPARATUS

Charles W. Hawthorne, York, Pa., assignor to Morgan Construction Company, Worcester, Mass., a corporation of Massachusetts Application April 26, 1946, Serial No. 665,254

8 Claims. (Cl. 164—66)

This invention relates to shearing apparatus, and more particularly to apparatus for severing metal bars as they travel longitudinally at high speed.

In the manufacture of metal rod for use in wire-drawing, it is the usual practice to supply heated billets to a continuous rod rolling mill which discharges its rolled product to suitable reels arranged to coil the rod into annular bundles. Thus all the material in one billet (except for losses from cropping of the ends and oxidation) goes into a single bundle, and the bundles weigh substantially the same as the billets. In some circumstances it would be advantageous to form two or more rod bundles from a single billet, and this could be accomplished by severing the finished rod and coiling the pieces separately. However, the delivery speed of modern rod mills is in excess of seventy feet per second, and the cutting and switching of metal bars at such speeds is a very difficult matter.

It is accordingly one object of the invention to provide a shearing apparatus capable of severing bars as they travel longitudinally at very high speeds.

It is a further object of the invention to provide a shearing apparatus capable of severing metal rods as they are discharged from a rod rolling mill.

It is a further object of the invention to provide a shearing apparatus capable of severing a rapidly traveling metal bar and directing the front end of the second portion of the bar into a different path of travel.

With these and other objects in view, as will be apparent to those skilled in the art, the invention resides in the combination of parts set forth in the specification and covered by the claims appended hereto.

Referring to the drawings illustrating one embodiment of the invention and in which like reference numerals indicate like parts.

Figure 2:
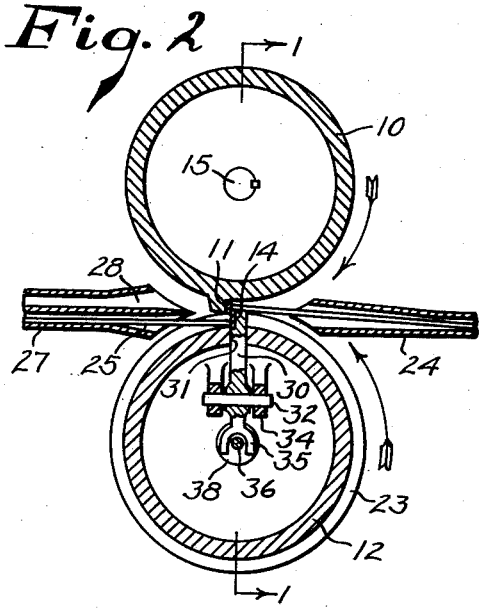
Fig. 2 is a section taken on the line 2—2 of Fig. 1.
Figure 3:
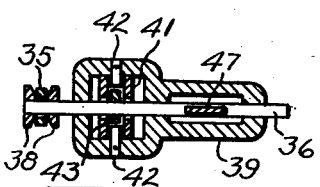
Fig. 3 is a section taken on the line 3—3 of Fig. 1.
Figure 4:
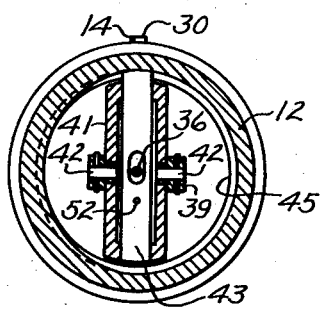
Fig. 4 is a section taken on the line 4—4 of Fig. 1.

The embodiment illustrated comprises an upper drum or carrier 10 having a shear blade 11 thereon and a lower drum or carrier 12 having a shear blade 14 thereon, these drums being mounted on parallel horizontal rotatable shafts 15 and 16 respectively. These shafts are mounted in suitable bearings 18 carried by a frame or casing 19, the shafts being connected by a pair of gears 20—21 within the casing. The lower shaft 16 extends beyond the casing so that it may be connected to a suitable driving means, such as an electric motor (not shown). The drums are rotated at such a speed that the peripheral speed of the blades will correspond rather closely to the speed of the rod which is to be severed. For example, if the speed of the rod is 70 feet per second, and the shear blades revolve in a circle say 18 inches in diameter, the drums should rotate at approximately 15 revolutions per second.

Means is provided to control the path of the rod as it travels through the shearing apparatus. For this purpose the lower drum 12 is provided with a peripheral groove 23 which is located in the same vertical plane as the upper blade 11. The approaching front end of each rod is directed tangentially into this groove 23 by a substantially horizontal guide pipe 24, and after this front end has passed between the drums it enters the lower passage 25 of a substantially horizontal guide pipe 27. This pipe 27 is also provided with an upper passage 28, and it will be understood that the two passages 25 and 28 may lead to separate rod coiling mechanisms (not shown).

Figure 1:
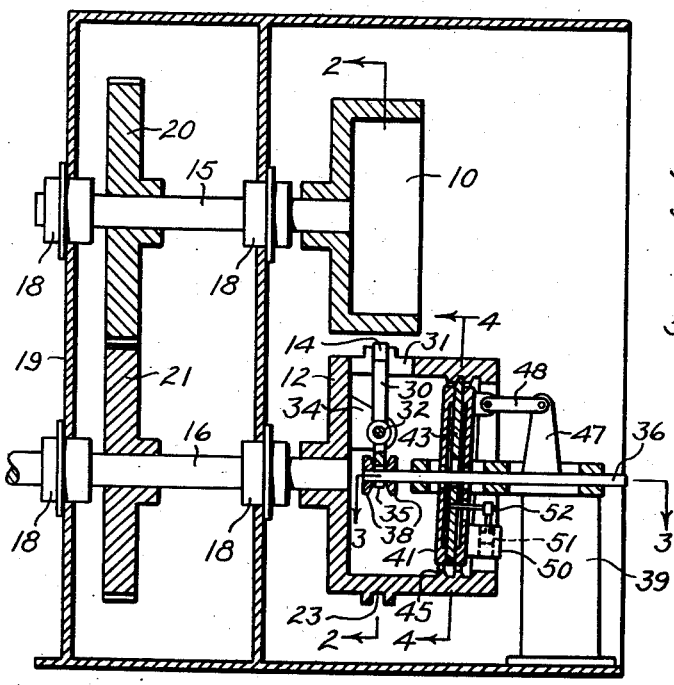
Fig. 1 is a transverse section through a shearing apparatus, the section being taken on the line 1—1 of Fig. 2.

The various parts are so constructed and arranged that the lower blade 14 may be moved transversely from a position at one side of the groove 23 to a position at the other side thereof, each of said positions being located beyond the groove, the blade being at the highest point in its orbit when aligned with the groove, as shown in Figs. 1 and 2. At that same instant the upper blade 11 will be at the lowest point in its orbit and in overlapping shearing relationship to the lower blade. Consequently the rod will be severed by the cooperative action of the blades. Preferably the upper blade overlaps the front surface of the lower blade, so that the lower blade will lift the new front end of the severed rod and cause it to enter the upper passage 28 an instant later. The lower blade 14 is secured to the outer end of a lever 30 which extends through a transverse slot 31 in the drum 12. This lever is fulcrumed intermediate its length on a pin 32 supported by ears 34 which project from the end wall of the drum 12. On the inner end of the lever 30 there is provided a fork 35 which straddles a rod 36 having two disks 38 fixed thereto on opposite sides of the fork. This rod 36 is supported for longitudinal sliding movements in line with the axis of the drum 12 by means of a suitable stationary bracket 39.

Figure 5:
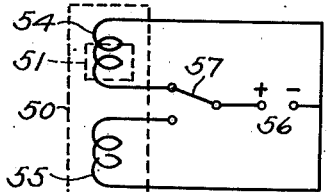
Fig. 5 is an electrical wiring diagram of certain circuits used to control the operation of the shearing apparatus.

Means is provided whereby the rod 36 may be moved in a definite timed relationship with the rotation of the drum 12. For this purpose an upright hollow control lever 41 is mounted within the drum, this lever being fulcrumed at its central point on a pair of aligned pins 42 mounted in the bracket 39 on opposite sides of the rod 36 and at right angles thereto. An elongated dog or control bar 43 is slidable longitudinally within the lever 41, the ends of this bar being adapted for selective engagement with a helical rib or screw-thread 45 formed on the inner surface of the drum 12 adjacent the ends of the lever 41, whereby the lever 41 may be rocked in an axial plane about its fulcrum pins 42. These movements of the lever are employed to actuate the rod 36, and for this purpose an arm 47 projects upwardly from the rod, this arm being connected to the lever 41 by a link 48. The bar 43 is actuated by means of a double-acting solenoid 50 mounted on the lever 41 and having a plunger 51 which is connected to a pin 52 projecting laterally from the bar. As indicated in Fig. 5, the solenoid 50 comprises two coils 54 and 55 which may be selectively connected to a source 56 of electricity by means of a suitable switch 57.

The operation of the invention will now be apparent from the above disclosure. Normally the rod 36 will rest at one end of its stroke, holding the lever 30 and the blade 14 at one side of the groove 23. The front end of a rapidly traveling rolled rod will approach the shearing apparatus through the guide pipe 24, pass through the groove 23, and enter the lower passage 25 of the guide 27. To sever the rod it is merely necessary to shift the switch 57, either manually or automatically by known means, and thereby energize one coil of the solenoid 50, say the coil 54, which had previously been deenergized.

This will lift the plunger 51 and slide the bar 43 upwardly to bring its upper end into engagement with the screw-thread 45, swinging the lever 41 about its fulcrum pins 42 and sliding the rod 36 inwardly. This will swing the lever 30 about its fulcrum pin 32, and at the midpoint in its travel the shear blade 14 will cross the groove 23. At this instant the blade 14 will be at the highest point in its orbit and the upper blade 11 will be at its lowest point, as shown in Fig. 2. Consequently the rolled rod will be severed, and the new front end thereof will be lifted by the blade 14 and directed into the upper passage 28. Before the completion of the next revolution of the drums, the blade 14 will have moved laterally beyond the groove 23 and out of the path of the stock, and the upper end of the bar 43 will come to rest at the inner side of the screw-thread 45. When it becomes time to sever the next rod, the switch 57 will be shifted to energize the coil 55, thus pulling the plunger 51 and the bar 43 downwardly to bring the lower end of the bar into engagement with the screw-thread 45. This will swing the lever 41 about its fulcrum pins 42 and slide the rod 36 outwardly, causing the lower shear blade 14 to cross the grooves 23 and sever the rolled rod as desired.

The apparatus is well adapted for operation at very high speeds, as there is a minimum of disturbance to the rod. Except for the slight lifting of the rod at the time of the cut, the rod travels in substantially a straight line through the apparatus. The screw-thread 45 provides a positive control for the lower blade so that it will be in exactly the correct position to effect a cut in cooperation with the upper blade and yet be at one side of the rod before another revolution is completed. Hence there is no danger of making two cuts in rapid succession on the same rod.

Having thus described my invention, what I claim as new and desire to secure by Letters Patent is:

1. Apparatus for severing longitudinally traveling bars comprising a revoluble carrier, means to guide each approaching bar in a path adjacent the carrier and tangential thereto, a blade mounted on the carrier to revolve therewith and movable transversely of the path of the bar, a helical screw-thread revoluble about its axis, means to revolve the carrier and the screw-thread in timed relationship, a lever fulcrumed intermediate its length for rocking movement substantially in an axial plane of the screw-thread, means to connect the opposite ends of the lever alternately to the screw-thread and thereby rock the lever, means connecting the lever to the blade to move the blade transversely of the path of the bar, and means cooperating with the blade to effect severance of the bar as the blade crosses the path of the bar.

2. Apparatus for severing longitudinally traveling bars comprising a revoluble carrier, means to guide each approaching bar in a path adjacent the carrier and tangential thereto, a blade mounted on the carrier to revolve therewith and movable transversely of the path of the bar, a helical screw-thread revoluble about its axis, means to revolve the carrier and the screw-thread in timed relationship, a lever fulcrumed adjacent to the axis of the screw-thread for rocking movement substantially in an axial plane of the screw-thread, means to connect the opposite ends of the lever alternately to the screw-thread and thereby rock the lever, means connecting the lever to the blade to move the blade transversely of the path of the bar, and means cooperating with the blade to effect severance of the bar as the blade crosses the path of the bar.

3. Apparatus for severing longitudinally traveling bars comprising a revoluble carrier, means to guide each approaching bar in a path adjacent the carrier and tangential thereto, a blade mounted on the carrier to revolve therewith and movable transversely of the path of the bar, a helical screw-thread coaxial with the carrier and revoluble therewith at the same speed, a lever fulcrumed adjacent to the axis of the screw-thread for rocking movement substantially in an axial plane, means to connect the opposite ends of the lever alternately to the screw-thread and thereby rock the lever, means connecting the lever to the blade to move the blade transversely of the path of the bar, and means cooperating with the blade to effect severance of the bar as the blade crosses the path of the bar.

4. Apparatus for severing longitudinally traveling bars comprising a revoluble hollow drum, means to guide each approaching bar in a path adjacent the drum and tangential thereto, a blade mounted on the drum to revolve therewith and movable transversely of the path of the bar, a helical screw-thread on the inner surface of the drum, a stationary bracket, a lever fulcrumed intermediate its length on the bracket for rocking movement substantially in an axial plane, means to connect the opposite ends of the lever alternately to the screw-thread and thereby rock the lever, means connecting the lever to the blade to move the blade transversely of the path of the bar, and means cooperating with the blade to effect severance of the bar as the blade crosses the path of the bar.

5. Apparatus for severing longitudinally traveling bars comprising a revoluble hollow drum, means to guide each approaching bar in a path adjacent the drum and tangential thereto, a blade mounted on the drum to revolve therewith and movable transversely of the path of the bar, a helical screw-thread on the inner surface of the drum, a stationary bracket extending into the drum, a lever fulcrumed intermediate its length on the bracket for rocking movement substantially in an axial plane, the ends of the lever being located adjacent the screw-thread, means to connect the opposite ends of the lever alternately to the screw-thread and thereby rock the lever, means connecting the lever to the blade to move the blade transversely of the path of the bar, and means cooperating with the blade to effect severance of the bar as the blade crosses the path of the bar.

6. Apparatus for severing longitudinally traveling bars comprising a revoluble hollow drum, means to guide each approaching bar in a path adjacent the drum and tangential thereto, a blade mounted on the drum to revolve therewith and movable transversely of the path of the bar, a helical screw-thread on the inner surface of the drum, a stationary bracket extending into the drum, a lever fulcrumed intermediate its length on the bracket for rocking movement substantially in an axial plane, a control bar mounted on the lever for longitudinal sliding movement along the same, means to slide the control bar and bring its opposite ends alternately into engagement with the screw-thread, thereby rocking the lever, means connecting the lever to the blade to move the blade transversely of the path of the bar, and means cooperating with the blade to effect severance of the bar as the blade crosses the path of the bar.

7. Apparatus for severing longitudinally traveling bars comprising a revoluble hollow drum, means to guide each approaching bar in a path adjacent the drum and tangential thereto, a blade mounted on the drum to revolve therewith and movable transversely of the path of the bar, a helical screw-thread on the inner surface of the drum, a stationary bracket extending into the drum, a lever fulcrumed intermediate its length on the bracket for rocking movement substantially in an axial plane, a control bar mounted on the lever for longitudinal sliding movement along the same, means to slide the control bar and bring its opposite ends alternately into engagement with the screw-thread, thereby rocking the lever, a rod supported on the bracket for longitudinal sliding movement substantially along the axis of the drum, means connecting the lever to the rod to slide the same, means connecting the rod to the blade to move the blade transversely of the path of the bar, and means cooperating with the blade to effect severance of the bar as the blade crosses the path of the bar.

8. Apparatus for severing longitudinally traveling bars comprising a revoluble hollow drum having a transverse slot therein, means to guide each approaching bar in a path adjacent the drum and tangential thereto, a blade lever pivotally mounted within the drum and having one end extending through the slot, a blade on the said end of the lever, a helical screw-thread on the inner surface of the drum, a stationary bracket extending into the drum, a control lever fulcrumed adjacent its midpoint on the said bracket and arranged for rocking movement substantially in an axial plane, a rod supported on the bracket for longitudinal sliding movement substantially along the axis of the drum, means connecting the rod to the blade lever to actuate the same and thus move the blade transversely of the path of the bar, means cooperating with the blade to effect severance of the bar as the blade crosses the path of the bar, means connecting the control lever to the rod to slide the rod, a control bar mounted on the control lever for longitudinal sliding movement along the same, and means to slide the control bar and bring its opposite ends alternately into engagement with the screw-thread, whereby the control lever will be rocked alternately in opposite directions.

CHARLES W. HAWTHORNE.

REFERENCES CITED

The following references are of record in the file of this patent:

UNITED STATES PATENTS

| Number | Name | Date |
|---|---|---|
| 2,401,639 | Hawthorne | June 4, 1946 |
| 2,414,772 | Sheperdson | Jan. 21, 1947 |

FOREIGN PATENTS

| Number | Country | Date |
|---|---|---|
| 482,393 | Germany | Sept. 14, 1929 |